(12) United States Patent
Wouters

(10) Patent No.: US 9,435,962 B2
(45) Date of Patent: Sep. 6, 2016

(54) KEYED INSERT CAP FOR A FIBER OPTIC CONNECTOR

(71) Applicant: Vincent A. Wouters, McKinney, TX (US)

(72) Inventor: Vincent A. Wouters, McKinney, TX (US)

(73) Assignee: OPTICAL CABLE CORPORATION, Roanoke, VA (US)

( * ) Notice: Subject to any disclaimer, the term of this patent is extended or adjusted under 35 U.S.C. 154(b) by 57 days.

(21) Appl. No.: 14/187,223

(22) Filed: Feb. 21, 2014

(65) Prior Publication Data

US 2015/0260923 A1 Sep. 17, 2015

Related U.S. Application Data

(60) Provisional application No. 61/767,788, filed on Feb. 21, 2013.

(51) Int. Cl.
*G02B 6/00* (2006.01)
*G02B 6/38* (2006.01)

(52) U.S. Cl.
CPC ............ *G02B 6/3831* (2013.01); *G02B 6/383* (2013.01); *G02B 6/3851* (2013.01)

(58) Field of Classification Search
CPC .. G02B 6/383; G02B 6/3831; G02B 6/3835; G02B 6/3851; G02B 6/389; G02B 6/3895
See application file for complete search history.

(56) References Cited

U.S. PATENT DOCUMENTS

| | | | | |
|---|---|---|---|---|
| 4,184,742 A * | 1/1980 | Corrales | ............... | G02B 6/383 385/78 |
| 4,239,334 A * | 12/1980 | Johnson | ............... | G02B 6/3809 385/64 |
| 4,323,300 A * | 4/1982 | Stewart | ............... | G02B 6/3885 385/59 |
| 4,496,213 A | 1/1985 | Borsuk | | |
| 5,394,494 A * | 2/1995 | Jennings | ............... | G02B 6/383 385/58 |
| 6,357,929 B1 | 3/2002 | Roehrs et al. | | |
| 6,371,660 B1 | 4/2002 | Roehrs et al. | | |
| 6,398,423 B1 * | 6/2002 | Novacoski | ........... | G02B 6/3851 385/53 |
| 6,848,834 B1 | 2/2005 | Roehrs et al. | | |
| 8,550,723 B2 * | 10/2013 | Shen | .................... | G02B 6/3887 385/53 |
| 8,834,037 B2 * | 9/2014 | Wouters | ................. | G02B 6/383 385/71 |
| 2009/0290839 A1 * | 11/2009 | Lin | ...................... | G02B 6/3831 385/55 |
| 2010/0209051 A1 | 8/2010 | Penumatcha et al. | | |
| 2011/0176775 A1 * | 7/2011 | Shen | .................... | G02B 6/4439 385/58 |
| 2013/0230283 A1 * | 9/2013 | Eberle | ................. | G02B 6/3831 385/78 |

FOREIGN PATENT DOCUMENTS

EP 0114230 A1 * 8/1984 ............. G02B 6/383

* cited by examiner

*Primary Examiner* — Rhonda Peace

(74) *Attorney, Agent, or Firm* — The Van Winkle Law Firm; David M. Carter; William G. Heedy

(57) ABSTRACT

An insert cap for a fiber optic connector defines a key for mating connectors.

12 Claims, 5 Drawing Sheets

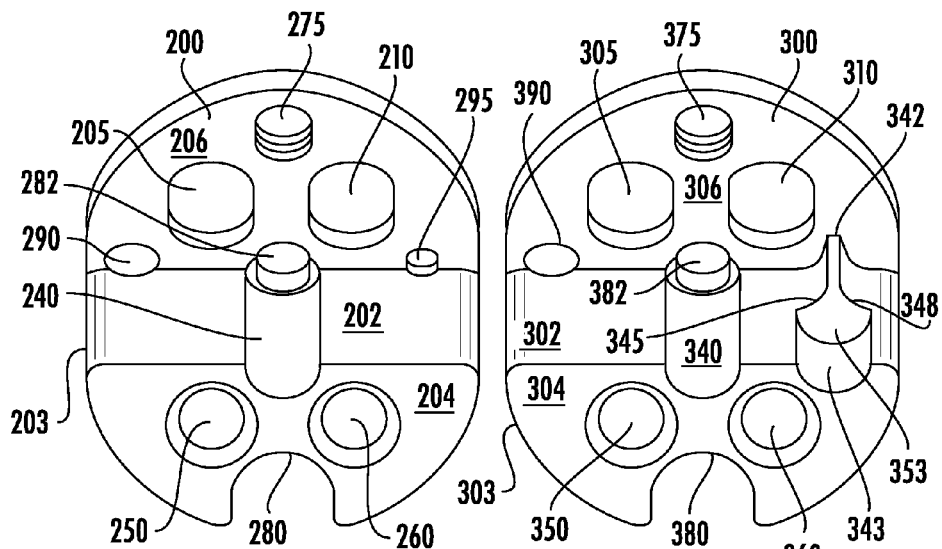

KEYED INSERT CAP FOR A FIBER OPTIC CONNECTOR

CROSS REFERENCE TO RELATED APPLICATIONS

This application claims priority to and incorporates entirely by reference U.S. Provisional Patent Application Ser. No. 61/767,788 filed on Feb. 21, 2013, entitled Keyed Insert Cap for a Fiber Optic Connector.

FIELD OF THE INVENTION

The invention relates to the field of connectors for fiber optic cables.

BACKGROUND

Fiber optic cables transmit signals along bundled optical fibers using light signals to relay information at extraordinary speeds with little attenuation. Fiber optic cables span long distances, of course, and must be connected to repeaters for transmission quality. The cables also connect to peripheral networking equipment and to other fiber optic cables for proper communication signal transmission.

The art of fiber optic communications is replete with different kinds of fiber optic cable connectors for numerous environments and specialized applications. Connector systems are already designed to resist extreme harsh mechanical and environmental conditions, including high vibration, mechanical and thermal shock, and fluid immersion. Also, these cables must continue to operate under extreme tension loading.

One key to providing efficient connections between different fiber optic cables is a user-friendly interface. This is particularly true when system integrators must select from different kinds of equipment with varying channel counts and diverse receptacle configurations, all of which are designed to address particular issues within a certain panel or enclosure routing fiber optics within a larger network.

With so many different kinds of connectors available to system installation professionals, it is difficult to ensure that a proper fiber optic cable intersects the appropriate mate with a convenient connector. Installers may damage equipment or significantly delay system operation by improperly mating optical fibers that are not intended to intersect.

A problem exists in the field of fiber optic cables in that installers must often visually inspect fiber connectors to determine which mating pairs should adjoin. Such visual determinations lead to errors and mismatched optical fiber connections. There is a need in the field of fiber optic communications for a connector that is mechanically structured to allow only appropriately mating optical fibers to connect.

SUMMARY

In one embodiment, the keys (343, 443, 543, 643) are integral with and defined by the respective towers (303, 403, 503, 603) of each insert cap. In other non-limiting embodiments, at least a portion of each key (343, 443, 543, 643) is defined by a shape of a portion of the rising edge (302, 402, 502, 602) extending substantially perpendicularly from the face (306, 406, 506, 606) of each insert cap. In another non-limiting embodiment, each key (343, 443, 543, 643) is defined by a shape of a portion of the top surface (304, 404, 504, 604) of the insert cap (i.e., the top surface of the respective towers (303, 403, 503, 603). In yet other embodiments, the keys (343, 443, 543, 643) have shapes that are defined by portions of both the rising edges (302, 402, 502, 602) and top surfaces (304, 404, 504, 604) of the insert cap.

BRIEF DESCRIPTION OF THE FIGURES

FIG. 2 is a perspective view of a prior art insert cap for separating pin and socket fiber optic terminals extending through a 4 channel connector.

FIG. 3 is a perspective view of a keyed insert cap having a right side key according to the disclosure herein.

FIG. 4 is a perspective view of a keyed insert cap having a left side key according to the disclosure herein.

FIG. 5 is a perspective view of a keyed insert cap having left side and right side keys according to the disclosure herein.

FIG. 6 is a perspective view of a keyed insert cap having a universal key shape.

DETAILED DESCRIPTION OF THE INVENTION

Figure 1:
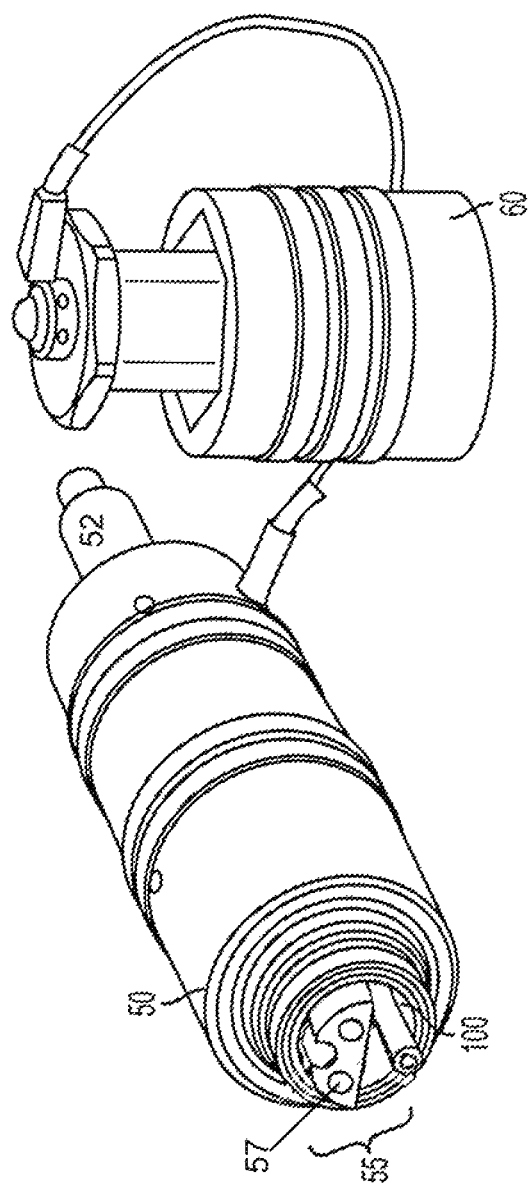
FIG. 1 is a plan view of a prior art fiber optic plug assembly showing the socket fiber optic connectors exposed therein.

An optical fiber connector (50) includes a housing body through which bundled optical fibers extend via a standard fiber optic cable. The connector (50) provides the appropriate interface allowing the fibers within a fiber optic cable (52) to connect to a mating pair from another cable, through a panel, or within peripheral equipment. As shown by the generally known fiber optic connector (50) of FIG. 1, a connector may have numerous terminal configurations such that the connector has socket terminals (57) and/or pin terminals for connecting mating pairs of optical fibers. Recessed within the outer face (55) of the pin and socket layout is an insert cap (100) that is generally a flat cap having appropriate openings so that individual ceramic ferrules protecting the fibers can extend through the insert cap (100) for adjoining a companion socket terminal. The insert cap (100) also has socket openings that allow optical fibers to extend there through for mating with another section of optical fiber on the other side of the insert cap (100).

A standard insert cap (200) is shown in prior art FIG. 2. This insert cap (200) includes guide pin receptacle (282) for aligning the fiber components through the insert cap (200) by inserting a guide pin (not shown) from a mating connector there through. When mating connectors have been disconnected, the central threaded bore (282) allows attachment of a handle with a corresponding thread pattern to remove the insert cap (200) from the connector to clean the tips of the optical fibers used in conjunction with the connector (50). Connecting screw hole (275) allows a first screw to hold the insert cap (200) within an overall connector (50) and provides stability for attaching the insert cap (200) to a mating connector and its respective insert cap. When a mating connector engages the connector (50), a second screw can extend along a screw recess (280) to mate with the first screw for additional security in connecting the insert cap (280) to the connector. Two alignment pin holes, one being a small pin hole (295) and one being a large pin hole (290), ensure proper orientation when installing the insert cap (200) into the connector. The pin receptacles (205, 210) allow the ceramic ferrules of a pin terminal to extend through the insert cap (200). Socket receptacles (250, 260) receive optical fibers through appropriate socket terminals at the outer face (553) of the connector (50).

The insert cap (200) is distinguished by its face (206) as well as a substantially perpendicular riser edge (202) that defines one exposed surface of the insert cap tower (203) and connects to a top surface (204) of the tower (203). The top surface of the overall tower (204) is configured to mate in a flush relationship with the face (206) of a separate insert cap of a mating connector, as will be discussed in more detail below.

The embodiments shown in FIGS. 3-6 each provide a keyed insert cap (300, 400, 500, 600) that respectively differentiate the individualized riser edges (302, 402, 502, 602) and top surfaces (304, 404, 504, 604) defining the tower (303, 403, 503, 603) of a fiber optic connector insert cap, so that only particular mating portions of specific connectors can fit together. The keyed insert caps (300, 400, 500, 600) will not allow an installer to connect fiber portions that are not intended to provide a single communications path within a particular system.

Each of the insert caps in FIGS. 3-6 include certain basic features that are generally similar to corresponding features in the prior art insert cap (200) shown in FIG. 2. These common features have been conveniently numbered so that common features have similar numbers. Similar to FIG. 2, the insert caps (300, 400, 500 600) include screw receptacles (375, 475, 575, 675) for fastening screws through the respective insert caps and holding the insert caps in place. A screw recess (380, 480, 580, 680) is defined on an outer surface of the tower (303, 403, 503, 603) of each insert cap to allow a screw from a mating connector to extend along the screw recess. A guide pin receptacle (382, 482, 582, 682) extends through, or is defined by, the middle of each device (300, 400, 500, 600), approximately midway between alignment pin holes (390, 395; 490, 495; 590, 595; 690, 695) that ensure proper orientation of each insert cap (300, 400, 500, 600) within an overall connector (50). The pin receptacles (305, 310; 405, 410; 505, 510; 605, 610) allow the ceramic ferrules of a pin terminal to extend through the respective insert caps. Socket receptacles (350, 360; 450, 460; 550, 560; 650, 660) receive optical fibers through appropriate socket terminals at the outer face (55) of a connector (50).

The keys (343, 443, 543, 643) are particularly shaped regions define by the surface of each insert cap (300, 400, 500, 600). The keys extend outwardly from the caps for mating with a matching receptacle that would be formed within the face of a matching connector. In one embodiment, the keys (343, 443, 543, 643) are integral with and defined by the respective towers (303, 403, 503, 603) of each insert cap. In other non-limiting embodiments, at least a portion of each key (343, 443, 543, 643) is defined by a shape of a portion of the rising edge (302, 402, 502, 602) extending substantially perpendicularly from the face (306, 406, 506, 606) of each insert cap. In another non-limiting embodiment, each key (343, 443, 543, 643) is defined by a shape of a portion of the top surface (304, 404, 504, 604) of the insert cap (i.e., the top surface of the respective towers (303, 403, 503, 603). In yet other embodiments, the keys (343, 443, 543, 643) have shapes that are defined by portions of both the rising edges (302, 402, 502, 602) and top surfaces (304, 404, 504, 604) of the insert cap.

Each of the insert caps has a unique use of the keys. FIGS. 3 and 4 include single keys (353, 453) on oppositely positioned sides of the insert caps (e.g., one on the right and one on the left, respectively). FIG. 5 uses two keys (553A, 553B) on either side of a surface of the insert cap. The insert caps (300, 400, 500) of FIGS. 3 4, 5, therefore have keys that require particular mating pairs with appropriate receptacles (i.e., key holes) (343, 443, 543, 643) to receive the keys before respective pin and socket terminals of the connector (50) and its mate would ever make contact.

The keys (353, 453, 553A, 553B) of FIGS. 3, 4, and 5 are characterized in part by a two-part body that includes a rounded base having shoulders (345, 348; 445, 448; 545A, 548A; 545B, 548B) that extend from the rounded base toward the guide pin receptacles (382, 482, 582) of each insert cap. The shoulders lead to a key edge (342, 442, 542) on each insert cap that further defines the required shape of a matching receptacle required for the pin and socket terminals to connect. In other words, the keys (353, 453, 553A, 553B) have a bulbous portion that tapers toward a top edge (342, 442, 542) to define a key shape extending from the insert cap.

FIG. 6 shows yet another keyed insert cap (600) in which the keys (643A, 643B) are universal keys that will mate with any one of the companion connectors that fit the respective keys of FIGS. 3-5. As shown in the drawing of FIG. 6, the universal key only includes the louver, bulbous, rounded base (653A, 653B) and not the key edges. Any mating companion connector with an opening for the rounded base (653A, 653B) will mate with the universal keyed insert cap of FIGS. 6.

Figure 7:
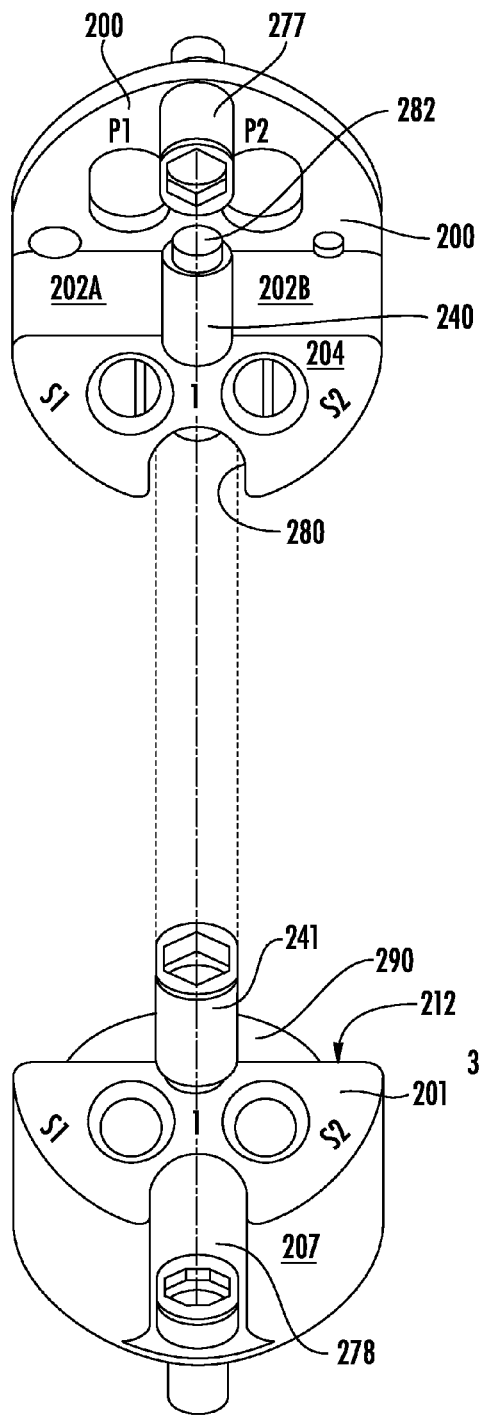
FIG. 7 is a prior art exploded view of a pair of insert caps.

FIGS. 7-1 show additional aspects of the keyed insert caps (200, 300, 400, 500, 600) in the context of being used with a mating connector that provides a mating insert cap (207, 307, 407, 507, 607) that is identical to but oriented exactly opposite of the insert cap (200, 300, 400, 500, 600). FIGS. 7-11 show that connectors (50A, 506) used to mate optical fibers can utilize identical insert caps (200/207; 300/307; 400/407; 500/507; 600/607) disclosed herein, only oriented oppositely within their respective connectors. The insert caps are oriented so that each allows optical fiber connection via pin receptacles (305, 310; 405, 410; 505, 510; 605, 610) allowing the ceramic ferrules of a pin terminal to extend through the respective insert caps. Socket receptacles (350, 360; 450, 460; 550, 560; 650, 660) receive optical fibers through appropriate socket terminals at the outer face (55) of a connector (50). FIGS. 7-11 furthermore illustrate particular aspects of the mating connector insert caps discussed above. For example, FIGS. 7-11 illustrate the first screws (277, 377, 477, 577, 677) extending through the face and screw hole of an insert cap. These same figures also show the second screws (278, 378, 478, 578, 678) extending through second screw holes and in some embodiments mating with the first screws. Respective screw recesses (278/280; 378/380; 478/480; 578/580; 678/680) provide proper surfaces for the first and second screws to traverse the insert caps and enter an appropriate screw hole for connection integrity. As shown in FIGS. 7-11, mating connectors (50A, 50B) utilizing corresponding insert caps disclosed herein (200/207; 300/307; 400/407; 500/507; 600/607), allow for a planned fit between appropriate surfaces defining the outer periphery of the insert caps.

Figure 8:
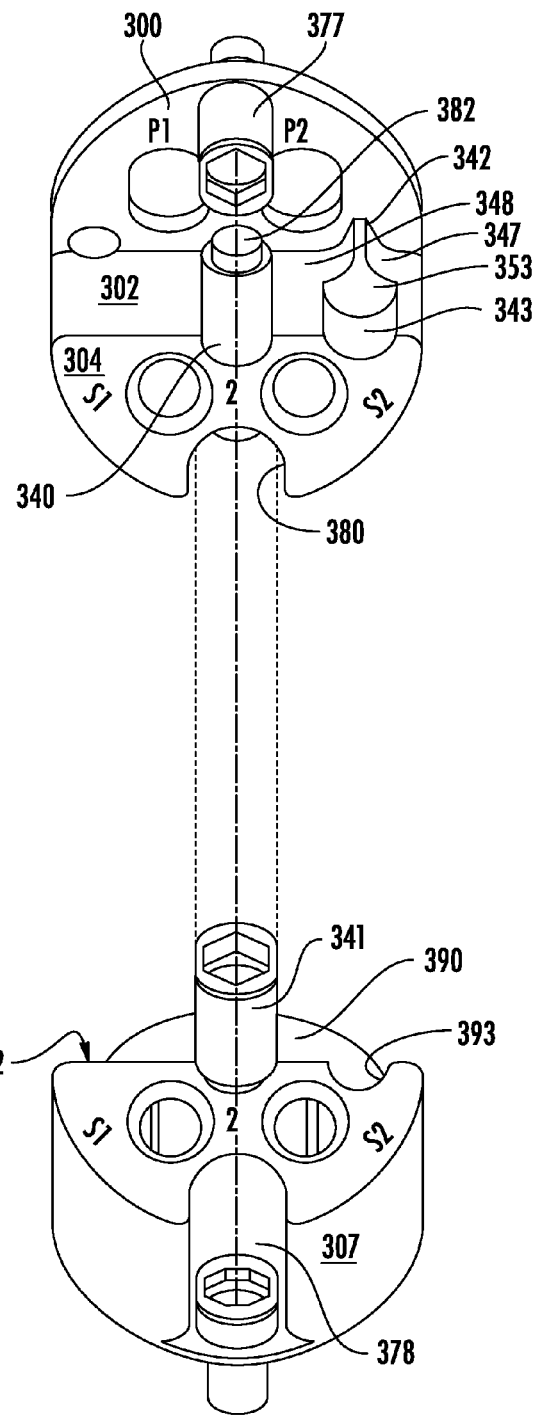
FIGS. 8-11 are exploded views of key arrangements for insert caps for use with mating connectors.
Figure 9:
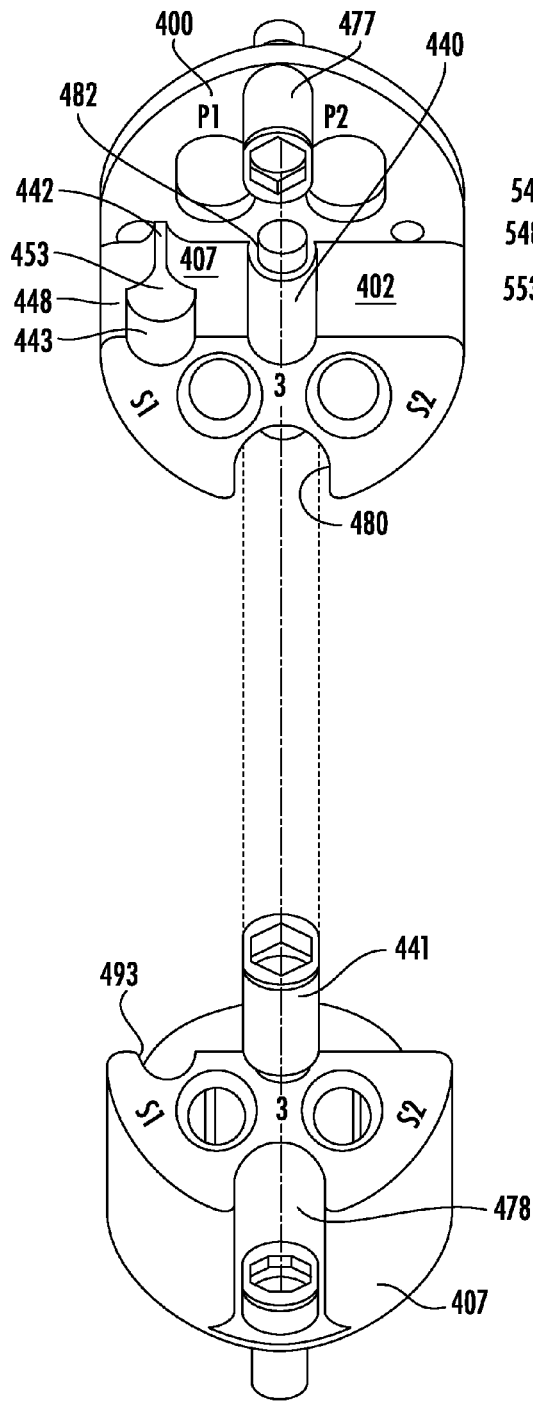
Figure 10:
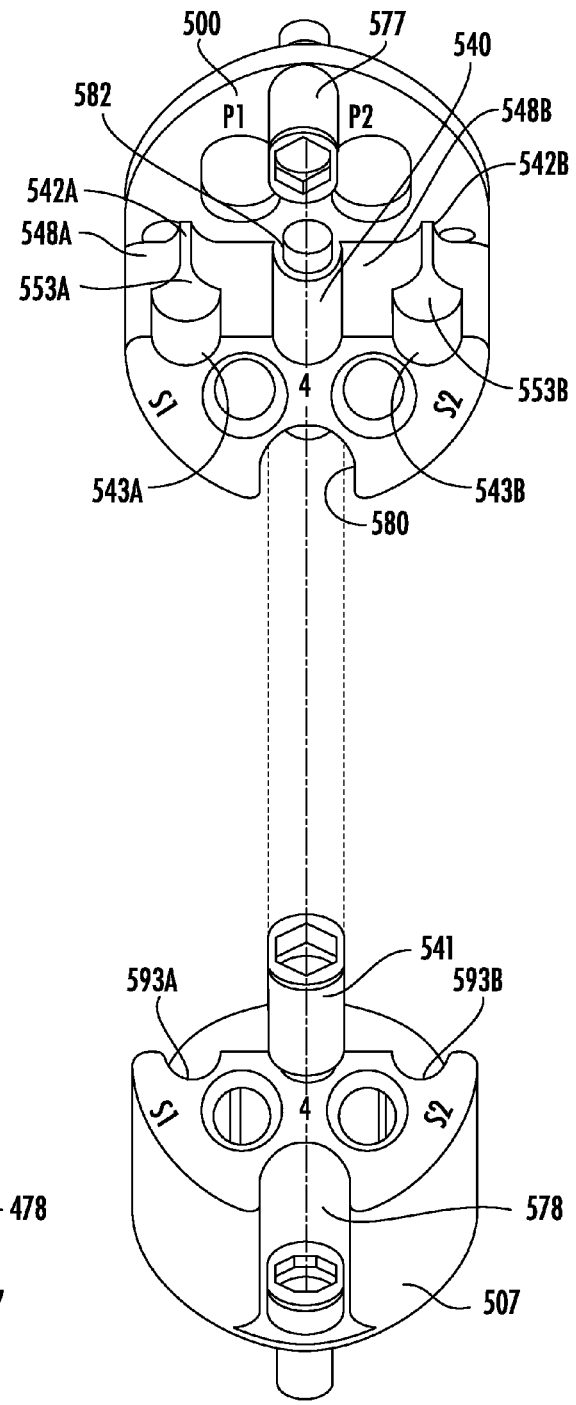
Figure 11:
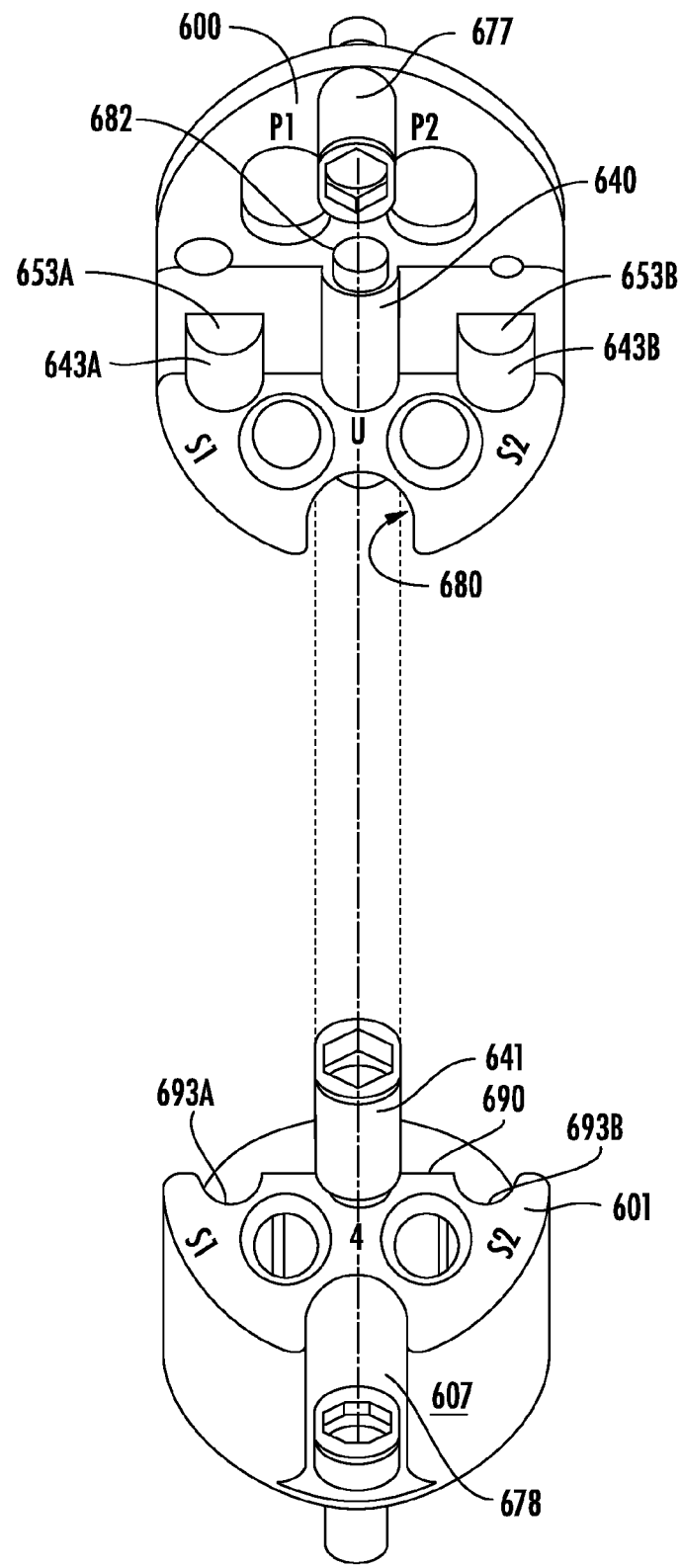

The insert caps shown in FIG. 7 mate without any use of keys and have been known in the prior art. Each corresponding surface mates appropriately for fiber connectivity. FIG. 8 shows right side key (343) defined by upwardly sloping contours (347, 348) of the rising edge (302) of the tower (303) defined in the insert cap (300). These upwardly sloping edges define the above mentioned rounded base and shoulders (345, 348) of the key that are integral with the tower (303) of the insert cap (300). In other words the keys are formed within the tower so that the tower (303) and the key (343) surfaces are continuous, uninterrupted smooth regions for mating. The tower regions of each insert cap also define the corresponding receptacles (393, 493, 593, 693) in which the keys fit. In other words, the rising edges (302, 402, 502, 602) of the towers (303, 403, 503, 603) are bifurcated so that a region closest to the flat face (306, 406, 506, 606) of the insert keys defines the key shape and an adjacent region of the tower is excavated to define a receptacle (393, 493, 593A, 593B, 693). As noted above, a universal key arrangement fits all of the aforementioned key shapes.

These and other aspects of the invention are set forth in the claims herein.

The invention claimed is:

1. An insert cap for a fiber optic connector comprising:
a tower defining a rising edge, said rising edge having a bifurcated surface defining a key shape and a receptacle;
said rising edge comprising at least one upwardly sloping contour defining said key shape;
a central threaded bore being sized and configured to allow for attachment of a handle with a corresponding thread pattern to remove the insert cap from the fiber optic connector to clean the tips of the optical fibers used in conjunction with the connector; and
wherein said key shape comprises a pair of sloping edges terminating at respective top edges and including a rounded base having shoulders extending from said rounded base.

2. An insert cap according to claim 1, wherein said rising edge comprises a plurality of upwardly sloping contours defining a plurality of key shapes.

3. An insert cap according to claim 1, wherein said rising edge of said tower defines at least one excavated adjacent region beside said key shape to form the receptacle.

4. An insert cap according to claim 3, wherein said key shape and the receptacle fit one another for mating oppositely disposed insert caps.

5. An insert cap according to claim 1, wherein said insert cap further comprises:
a left key shape positioned along a first portion of said bifurcated surface;
a right key shape positioned along said first portion of said bifurcated surface;
a left receptacle excavated from a second portion of said bifurcated surface;
a right receptacle excavated from said second portion of said bifurcated surface, and
wherein said key shapes are so dimensioned to fit within said receptacles.

6. An insert cap for a fiber optic connector comprising:
a tower extending substantially perpendicularly from a face of the insert cap and defining a rising edge and a top surface of said tower;
a key shape extending from said face toward said top surface and including a rounded base and at least one shoulder extending from a top edge of said key shape toward said rising edge of said tower;
a receptacle defined within said rising edge of said tower, said receptacle defined by an excavated region of said rising edge of said tower; and
a central threaded bore being sized and configured to allow for attachment of a handle with a corresponding thread pattern to remove the insert cap from the fiber optic connector to clean the tips of the optical fibers used in conjunction with the connector.

7. An insert cap according to claim 6, wherein said excavated region is positioned between said key shape and said top surface of said tower.

8. An insert cap according to claim 6, wherein said rising edge of said tower and said key shape define a continuous surface of said insert cap.

9. An insert cap according to claim 6, wherein said rising edge of said tower is bifurcated to define a first region of said rising edge closest to said face of said insert cap and a second region of said rising edge adjacent to said first region such that said second region is between said first region and said top surface of said tower.

10. An insert cap according to claim 6, wherein said receptacle is defined within said second region of said rising edge.

11. An insert cap according to claim 10, wherein said rising edge defines a plurality of key shapes along said first region of said rising edge.

12. An insert cap according to claim 10, wherein said rising edge defines a plurality of receptacles along said second region of said rising edge.

* * * * *